(12) United States Patent
Wang

(10) Patent No.: US 11,409,329 B2
(45) Date of Patent: Aug. 9, 2022

(54) FLEXIBLE DISPLAY, PREPARATION METHOD THEREOF AND ELECTRONIC DEVICE HAVING THE SAME

(71) Applicant: BEIJING XIAOMI MOBILE SOFTWARE CO., LTD., Beijing (CN)

(72) Inventor: Ching-Sung Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 311 days.

(21) Appl. No.: 16/587,019

(22) Filed: Sep. 29, 2019

(65) Prior Publication Data

US 2020/0356142 A1    Nov. 12, 2020

(30) Foreign Application Priority Data

May 9, 2019   (CN) .......................... 201910386447.X

(51) Int. Cl.
| | | |
|---|---|---|
| *H01Q 1/24* | (2006.01) | |
| *G06F 1/16* | (2006.01) | |
| *H01Q 9/04* | (2006.01) | |
| *H01Q 9/42* | (2006.01) | |
| *H01Q 21/28* | (2006.01) | |

(52) U.S. Cl.
CPC ........... *G06F 1/1652* (2013.01); *H01Q 1/243* (2013.01); *H01Q 9/0414* (2013.01); *H01Q 9/42* (2013.01); *H01Q 21/28* (2013.01)

(58) Field of Classification Search
CPC ........ H01Q 21/28; H01Q 9/42; H01Q 9/0414; H01Q 1/243
See application file for complete search history.

(56) References Cited

U.S. PATENT DOCUMENTS

2018/0227399 A1*  8/2018  Lee .................... H01Q 21/28

FOREIGN PATENT DOCUMENTS

| CN | 108140930 A | 6/2018 |
|---|---|---|
| CN | 108493212 A | 9/2018 |
| CN | 108594934 A | 9/2018 |

OTHER PUBLICATIONS

Extended European Search Report for EP application 19206414.5, dated May 13, 2020.
Optically Invisible Antenna Integrated Within an OLED Touch Display Panel for IoT Applications, Wonbin Hong et al., IEEE Transactions on Antennas and Propagation, vol. 65, No. 7, Jul. 2017.
CN first office action in Application No. 201910386447.X, dated Feb. 11, 2022.
Wonbin Hong et al., Title: Optically Invisible Antenna Integrated Within an OLED Touch Display Panel for IoT Applications, IEEE Transactions On Antennas and Propagation, May 17, 2017.

* cited by examiner

*Primary Examiner* — Graham P Smith
(74) *Attorney, Agent, or Firm* — Syncoda LLC; Feng Ma

(57) ABSTRACT

A flexible display includes: an antenna region, provided thereon with a metal trace configured as an antenna of an electronic device to receive or transmit a signal; and a display region configured to display screen content of the electronic device.

19 Claims, 7 Drawing Sheets

FLEXIBLE DISPLAY, PREPARATION METHOD THEREOF AND ELECTRONIC DEVICE HAVING THE SAME

CROSS-REFERENCE TO RELATED APPLICATIONS

This application claims priority to Chinese Patent Application No. 201910386447.X filed on May 9, 2019, the disclosure of which is hereby incorporated by reference in its entirety.

BACKGROUND

With the advancement of display technologies, to pursue more ideal full-screen designs, manufacturers continue to reduce borders of electronic devices so as to increase a screen-to-body ratio of the devices.

SUMMARY

The present disclosure relates generally to the field of display technologies, and more specifically to a flexible display.

Embodiments of the present disclosure provide a flexible display, a preparation method thereof and an electronic device having the same.

According to a first aspect of embodiments of the present disclosure, there is provided a flexible display, including: an antenna region, provided thereon with a metal trace which is configured as an antenna of an electronic device to receive or transmit a signal; and a display region, configured to display screen content of the electronic device.

In some embodiments, the antenna region includes an antenna subregion located at any edge region of the flexible display.

In some embodiments, the antenna region includes two antenna subregions located at two adjacent or opposite edge regions of the flexible display, respectively.

In some embodiments, the antenna region includes three antenna subregions located at any three edge regions of the flexible display, respectively.

In some embodiments, the antenna region includes four antenna subregions located at four edge regions of the flexible display, respectively.

In some embodiments, the flexible display has a rectangular cross section, and at least one antenna subregion of the antenna region is located at one or more edge regions of the rectangular cross section.

In some embodiments, the flexible display has a U-shaped cross section, and at least one antenna subregion of the antenna region is located at one or two side regions of the U-shaped cross section.

In some embodiments, the display region is disposed at an upper surface of a shell of the electronic device;

at least one antenna subregion of the antenna region is disposed at the upper surface of the shell of the electronic device; or at least one antenna subregion of the antenna region is disposed at the upper surface of the shell of the electronic device and extends to a frame of the shell; or at least one antenna subregion of the antenna region is disposed at a frame of the shell.

In some embodiments, the display region is disposed at an upper surface of a shell of the electronic device and extends to a frame of the shell; and at least one antenna subregion of the antenna region is disposed at the frame of the shell of the electronic device.

In some embodiments, in a cross section of the flexible display, for at least one antenna subregion, a distance between a perpendicular line from a boundary point between the display region and the antenna subregion to the upper surface of the shell and a perpendicular line from any point of the antenna subregion other than the boundary point to the upper surface of the shell is greater than 0.

In some embodiments, the display region is disposed at an upper surface of a shell of the electronic device; and at least one antenna subregion of the antenna region is disposed at a frame of the shell of the electronic device and extends to a lower surface of the shell.

In some embodiments, the display region is disposed at an upper surface of a shell of the electronic device and extends to a frame of the shell; and at least one antenna subregion of the antenna region is disposed at the frame of the shell of the electronic device and extends to a lower surface of the shell.

In some embodiments, for at least one antenna subregion, a maximum value of perpendicular distances from any point of the antenna subregion to a plane where the upper surface of the shell is located is equal to a thickness of the electronic device.

In some embodiments, the antenna region is located at a partial or whole region of the flexible display disposed at an upper surface of a shell of the electronic device.

In some embodiments, the flexible display includes a flexible substrate, a thin film transistor (TFT) circuit layer, a luminescent layer, a flexible encapsulation layer, a polarizing layer, an optically clear adhesive (OCA) layer and a cover glass/polyimide (CG/PI) layer.

In some embodiments, the metal trace in the antenna region is disposed on one or more of the polarizing layer, the OCA layer and the CG/PI layer.

In some embodiments, the flexible display further includes an antenna layer disposed between the OCA layer and the CG/PI layer or between the polarizing layer and the OCA layer.

In some embodiments, the metal trace in the antenna region is disposed on the antenna layer.

In some embodiments, the metal trace includes any one or more selected from copper, iron, aluminum, argentum, tin, gold, nickel, chromium, indium, zinc and alloys or oxides thereof, and fiberglass.

According to a second aspect of embodiments of the present disclosure, there is provided an electronic device, including: a flexible display as described in any embodiment of the first aspect hereinbefore; and a shell.

According to a third aspect of embodiments of the present disclosure, there is provided a method for preparing a flexible display as described in any embodiment of the first aspect hereinbefore, including:

providing, in sequence, a thin film transistor (TFT) circuit layer, a luminescent layer and a flexible encapsulation layer on a flexible substrate;

providing, in sequence, a polarizing layer, an optically clear adhesive (OCA) layer and a cover glass/polyimide (CG/PI) layer on the flexible encapsulation layer; and providing a metal trace on a specified region of one or more of the polarizing layer, the OCA layer and the CG/PI layer, the specified region being configured as an antenna region, and the metal trace being configured as an antenna of an electronic device.

In some embodiment, the metal trace includes any one or more selected from copper, iron, aluminum, argentum, tin, gold, nickel, chromium, indium, zinc and alloys or oxides thereof, and fiberglass.

According to a fourth aspect of embodiments of the present disclosure, there is provided a method for preparing a flexible display as described in any embodiment of the first aspect hereinbefore, including:

providing, in sequence, a thin film transistor (TFT) circuit layer, a luminescent layer and a flexible encapsulation layer on a flexible substrate;

providing, in sequence, a polarizing layer, an optically clear adhesive (OCA) layer, an antenna layer and a cover glass/polyimide (CG/PI) layer on the flexible encapsulation layer, or providing, in sequence, a polarizing layer, an antenna layer, an OCA layer and a CG/PI layer on the flexible encapsulation layer; and providing a metal trace on a specified region of the antenna layer, the specified region being configured as an antenna region, and the metal trace being configured as an antenna of an electronic device.

In some embodiment, the metal trace includes any one or more selected from copper, iron, aluminum, argentum, tin, gold, nickel, chromium, indium, zinc and alloys or oxides thereof, and fiberglass.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

In the drawings.

Figure 1:
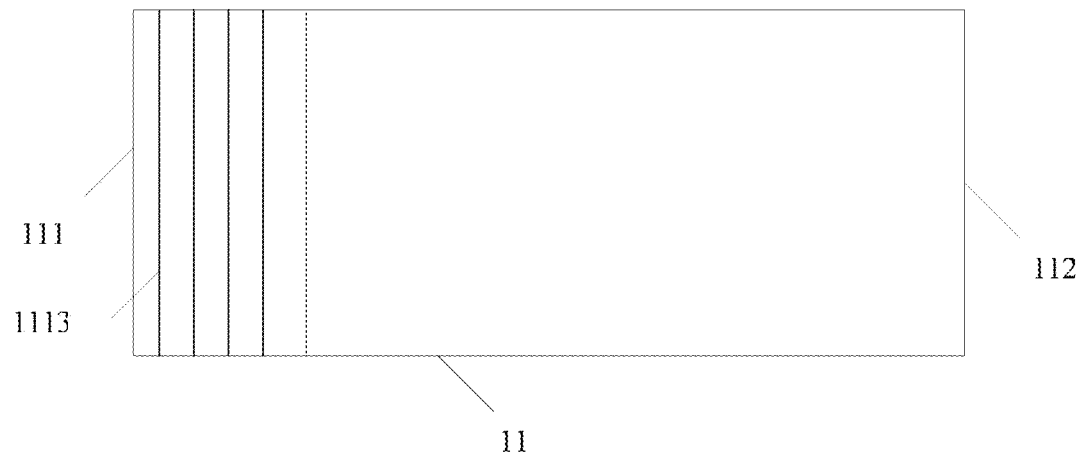
FIG. 1 is a schematic diagram of a flexible display according to some embodiments of the present disclosure.
Figure 2A:
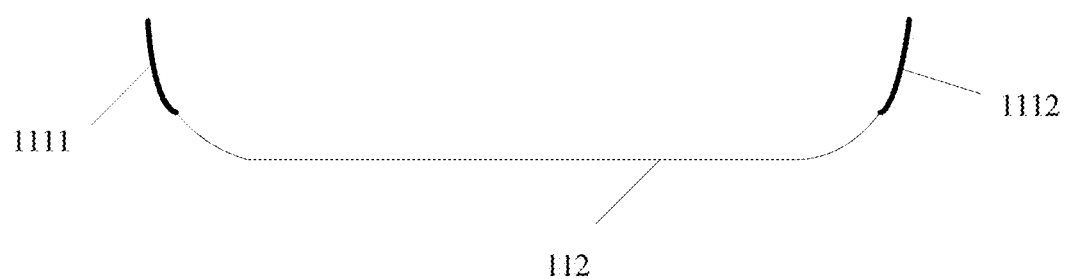
FIG. 2A is a sectional view of a flexible display according to some embodiments of the present disclosure.
Figure 2B:
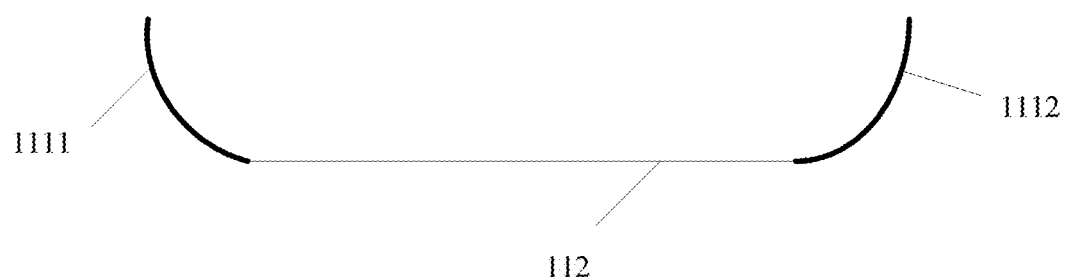
FIG. 2B is a sectional view of a flexible display according to some embodiments of the present disclosure.
Figure 2C:
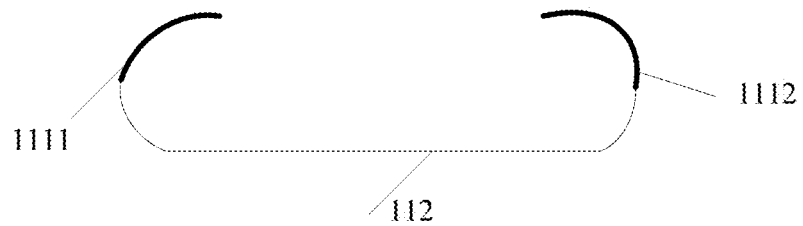
FIG. 2C is a sectional view of a flexible display according to some embodiments of the present disclosure.
Figure 2D:
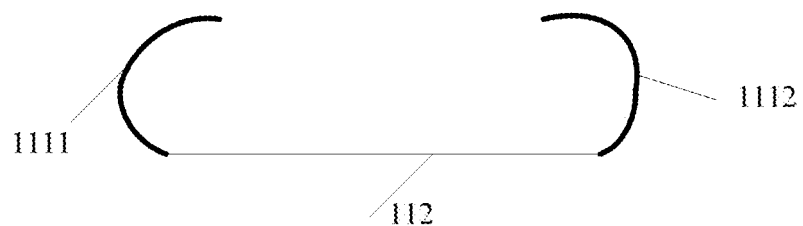
FIG. 2D is a sectional view of a flexible display according to some embodiments of the present disclosure.

flexible display 11; antenna region 111; display region 112; first antenna subregion 1111; second antenna subregion 1112; metal trace 1113; shell 12; first frame 121; second frame 122; flexible substrate 21; FTT circuit layer 22; luminescent layer 23; flexible encapsulation layer 24; polarizing layer 25; OCA layer 26; CG/PI layer 27; antenna layer 28.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

With the advent of the fifth-generation mobile communication technologies (5G), in order to meet the communication requirements of 5G, the number of antennas of the electronic device as well as frequencies and bandwidths supported by the antennas may need to be increased correspondingly. However, with the enlargement of the flexible display, the space reserved for the antenna in the electronic device is getting smaller and smaller, and even no space is left for placing the antennas. Accordingly, a new flexible display is provided according to some embodiments of the disclosure, which can meet both display and communication requirements.

FIG. 1 is a schematic diagram of a flexible display according to some embodiment of the present disclosure. The flexible display 11 is a foldable display, which can be folded or unfolded with a shell and is usually installed on a foldable electronic device, such as a foldable smartphone, a foldable laptop, and a foldable tablet, etc.

The flexible display 11 can also be installed on a non-foldable electronic device, such as a non-foldable bar phone, a non-foldable phablet, a non-foldable desktop computer, etc.

According to some embodiments of the present disclosure, the flexible display 11 can be made of a flexible material, such as a plastic, a metal foil or other materials. As illustrated in FIG. 1, the flexible display 11 includes an antenna region 111 and a display region 112.

In some embodiments, the flexible display 11 can be an organic light-emitting diode (OLED) display, or other types of displays. The screen can include a touch panel, the screen can be implemented as a touch screen to receive input signals from the user. The touch panel includes one or more touch sensors to sense touch, sliding and gestures on the touch panel. The touch sensor can not only sense the boundary of the touch or sliding operation, but also detect the duration and pressure associated with the touch or sliding operation.

The antenna region 111 is provided thereon a metal trace 1113 which is configured as an antenna of an electronic device to receive or transmit a signal. The metal trace 1113 can include any one or more selected from copper, iron, aluminum, argentum, tin, gold, nickel, chromium, indium, zinc and alloys or oxides thereof, and fiberglass. In some embodiments, the metal trace 1113 is made of a material selected from copper, iron, aluminum, argentum, tin, gold, nickel, chromium, indium, zinc and alloys or oxides thereof, and fiberglass. The metal trace 1113 can be provided in a lateral direction or a longitudinal direction, and the present disclosure is not limited thereto. Generally, one end of the metal trace 1113 is electrically connected to the shell 12 of the electronic device, and the other end of the metal trace 1113 is connected to a radio-frequency (RF) front-end circuit. The RF front-end circuit has a transceiving function (i.e., transmission/reception function), and is capable of converting and processing RF signals and intermediate frequency signals.

The display region 112 has a displaying function and is configured to display screen content of the electronic device.

It should be noted that, FIG. 1 just illustrates some implementations of the flexible display, in which the antenna region is located at a left edge region of the flexible display. In other embodiments, the antenna region can be located at other regions, such as a right edge region, of the flexible display.

In the flexible display according to embodiments of the present disclosure, by providing the antenna region at the flexible display and providing the metal trace on the antenna region to be used as an antenna of an electronic device, there is no need to separately reserve space for the antenna at the electronic device, and thus both the display and communication requirements of the electronic device are satisfied.

In some embodiments of the present disclosure, the antenna region 111 includes at least one antenna subregion located at an edge region of the flexible display.

In some implementations, the antenna region includes one antenna subregion located at any edge region of the flexible display.

In some other implementations, the antenna region includes two antenna subregions located at two adjacent or opposite edge regions of the flexible display, respectively.

In yet some other implementations, the antenna region includes three antenna subregions located at any three edge regions of the flexible display, respectively.

In yet some other implementations, the antenna region includes four antenna subregions located at four edge regions of the flexible display, respectively.

In some embodiments of the present disclosure, the flexible display can be configured as a curved display, such as a dual-curved display or a quad-curved display.

The flexible display has a U-shaped cross section, and at least one antenna subregion is located at one or two side regions of the U-shaped cross section. Specifically, in an embodiment, the antenna region includes one antenna subregion, and the one antenna subregion can be located at any side region of the U-shaped cross section. In another embodiment, the antenna region includes two or more antenna subregions, and the two or more antenna subregions can be located at two side regions of the U-shaped cross section. In some embodiments, the antenna region 111 includes two antenna subregions, which are referred as a first antenna subregion 1111 and a second antenna subregion 1112, respectively, and the first antenna subregion 1111 and the second antenna subregion 1112 are located at two opposite edge regions of the flexible display, respectively. For example, as illustrated in FIG. 2A to FIG. 2D, the flexible display 11 has a U-shaped cross section, and the first antenna subregion 1111 and the second antenna subregion 1112 are located at two side regions of the U-shaped cross section, respectively.

In some embodiments of the present disclosure, the flexible display can be configured as a non-curved display, such as a flat display with a substantially flat surface. In such a case, the flexible display can have a rectangular shape, and the antenna region 111 and the display region 112 of the flexible display can be located in a same plane.

Figure 3:
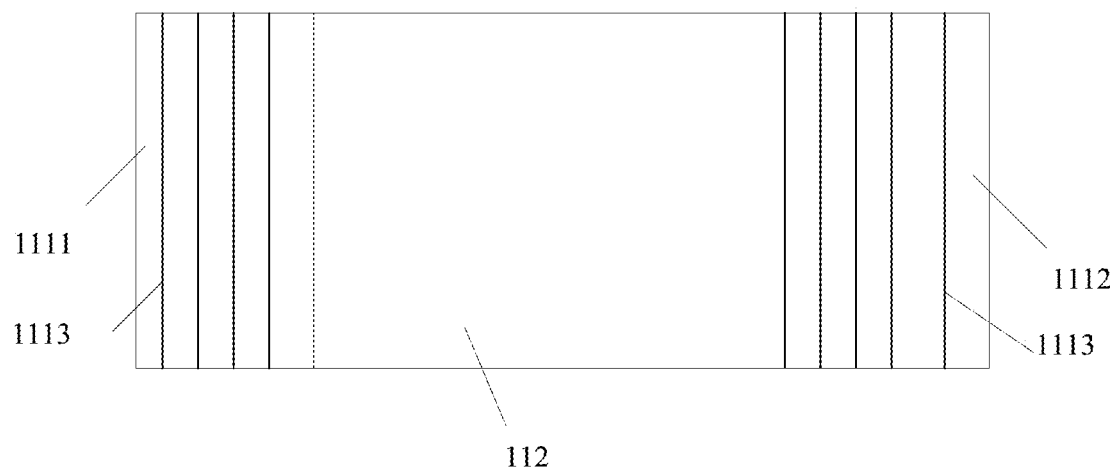
FIG. 3 is a schematic diagram of a flexible display according to some embodiments of the present disclosure.

A cross section of the flexible display can also be rectangular, and at least one antenna subregion can be located at one or more edge regions of the rectangular cross section. For example, the antenna region 111 includes two antenna subregions, which are referred as a first antenna subregion 1111 and a second antenna subregion 1112, respectively. As illustrated in FIG. 3, the first antenna subregion 1111, the second antenna subregion 1112 and the display region 112 of the flexible display are located at a same plane, and the first antenna subregion 1111 and the second antenna subregion 1112 are located at two opposite edge regions of the rectangular cross section, respectively.

In some embodiments of the present disclosure, depending on a positional relationship between the flexible display and the shell, the flexible display can include, but is not limited to the following structures.

In a first structure of the flexible display, the display region 112 is disposed at an upper surface of the shell 12 of the electronic device, and at least one antenna subregion of the antenna region is disposed at the upper surface of the shell 12 of the electronic device.

For example, the antenna region 111 includes a first antenna subregion 1111 and a second antenna subregion 1112, which are located at two opposite edges of the flexible display, respectively.

Figure 4A:
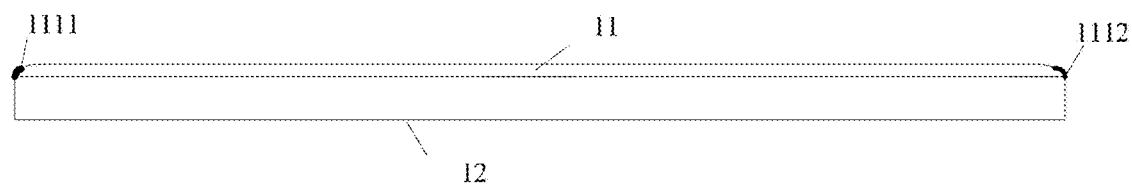
FIG. 4A is a schematic diagram of an electronic device according to some embodiments of the present disclosure.
Figure 4B:
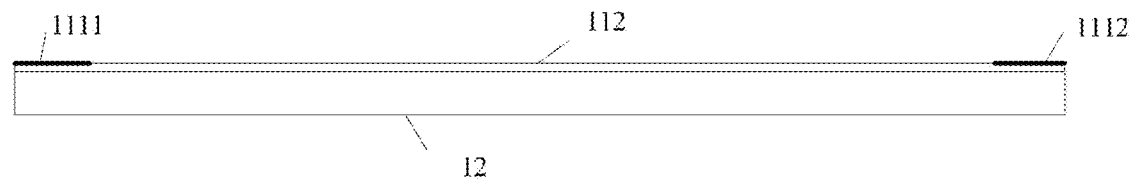
FIG. 4B is a schematic diagram of an electronic device according to some embodiments of the present disclosure.

According to the positional relationship as described in the first structure of the flexible display, the display region 112 is disposed at the upper surface of the shell 12 of the electronic device, and both the first antenna subregion 1111 and the second antenna subregion 1112 are disposed at the upper surface of the shell 12 of the electronic device. In a case that the flexible display is configured as a curved display, a structure as illustrated in FIG. 4A may be obtained. In a case that the flexible display is configured as a non-curved display, a structure as illustrated in FIG. 4B may be obtained.

In a second structure of the flexible display, the display region 112 is disposed at an upper surface of the shell 12 of the electronic device, and at least one antenna subregion of the antenna region is disposed at the upper surface of the shell 12 of the electronic device and extends to a frame of the shell 12.

Figure 5:
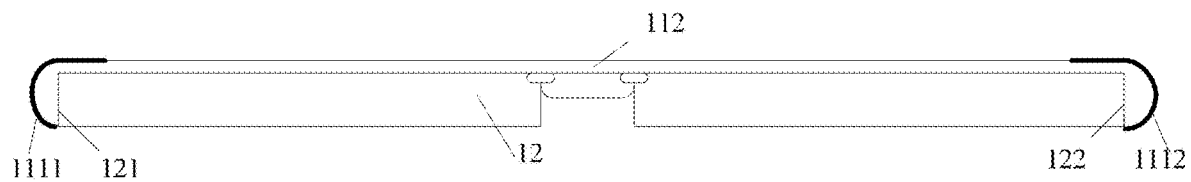
FIG. 5 is a schematic diagram of an electronic device according to some embodiments of the present disclosure.

For example, the antenna region 111 includes a first antenna subregion 1111 and a second antenna subregion 1112, which are located two opposite edge regions of the flexible display, respectively. According to the positional relationship as described in the second structure of the flexible display, the display region 112 is disposed at the upper surface of the shell 12 of the electronic device, the first antenna subregion 1111 is disposed at the upper surface of the shell 12 of the electronic device and extends to a first frame 121 of the shell 12, and the second antenna subregion 1112 is disposed at the upper surface of the shell 12 of the electronic device and extend to a second frame 122 of the shell 12, as illustrated in FIG. 5.

In a third structure of the flexible display, the display region 112 is disposed at an upper surface of the shell 12 of the electronic device, and at least one antenna subregion of the antenna region is disposed at a frame of the shell 12.

Figure 6:
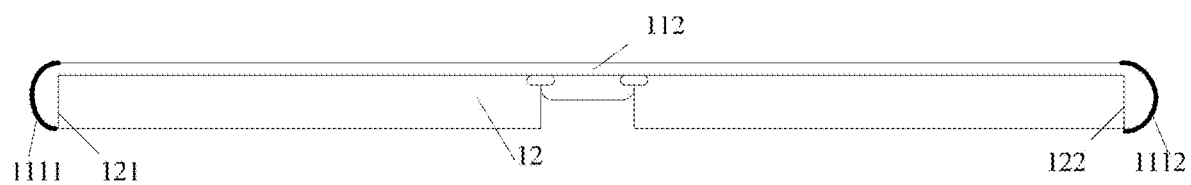
FIG. 6 is a schematic diagram of an electronic device according to some embodiments of the present disclosure.

For example, the antenna region 111 includes a first antenna subregion 1111 and a second antenna subregion 1112, which are located two opposite edge regions of the flexible display, respectively. According to the positional relationship as described in the third structure of the flexible display, the display region 112 is disposed at the upper surface of the shell 12 of the electronic device, the first antenna subregion 1111 is disposed at a first frame 121 of the shell 12 of the electronic device, and the second antenna subregion 1112 is disposed at a second frame 122 of the shell 12 of the electronic device, as illustrated in FIG. 6.

In a fourth structure of the flexible display, the display region 112 is disposed at an upper surface of the shell 12 of the electronic device and extends to a frame of the shell 12, and at least one antenna subregion of the antenna region is disposed at the frame of the shell 12.

Figure 7:
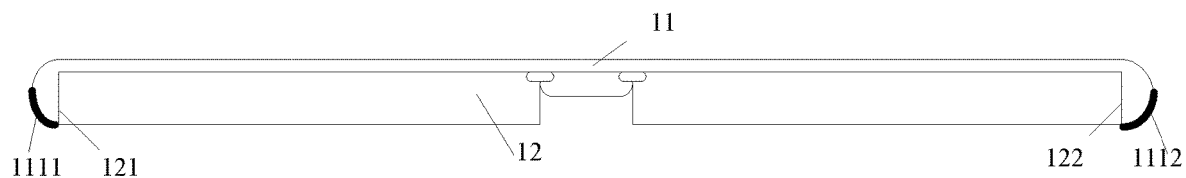
FIG. 7 is a schematic diagram of an electronic device according to some embodiments of the present disclosure.

For example, the antenna region 111 includes a first antenna subregion 1111 and a second antenna subregion 1112, which are located two opposite edge regions of the flexible display, respectively. According to the positional relationship as described in the fourth structure of the flexible display, the display region 112 is disposed at the upper surface of the shell 12 of the electronic device and extends to a first frame 121 and a second frame 122 of the shell, and the first antenna subregion 1111 and the second antenna subregion 1112 are disposed at the first frame 121 and the second frame 122 of the shell 12, respectively, as illustrated in FIG. 7.

In a fifth structure of the flexible display, the display region 112 is disposed at an upper surface of the shell 12 of the electronic device, and at least one antenna subregion of the antenna region is disposed at a frame of the shell 12 of the electronic device and extends to a lower surface of the shell 12.

Figure 8:
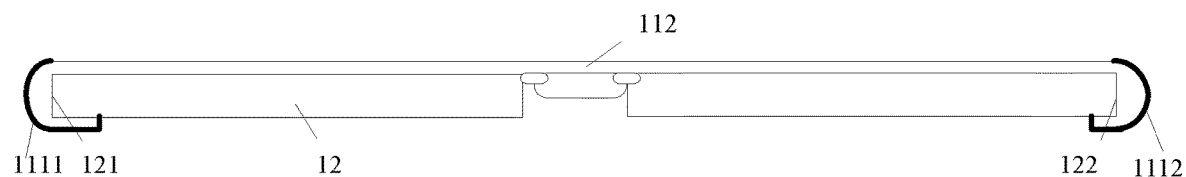
FIG. 8 is a schematic diagram of an electronic device according to some embodiments of the present disclosure.

For example, the antenna region 111 includes a first antenna subregion 1111 and a second antenna subregion 1112, which are located two opposite edge regions of the flexible display, respectively. According to the positional relationship as described in the fifth structure of the flexible display, the display region 112 is disposed at the upper surface of the shell 12 of the electronic device, the first antenna subregion 1111 is disposed at a first frame 121 of the shell 12 of the electronic device and extends to the lower surface of the shell 12, and the second antenna subregion 1112 is disposed at a second frame 122 of the shell 12 of the electronic device and extends to the lower surface of the shell 12, as illustrated in FIG. 8.

In a sixth structure of the flexible display, the display region 112 is disposed at an upper surface of the shell 12 of the electronic device and extends to a frame of the shell 12, and at least one antenna subregion of the antenna region is disposed at the frame of the shell 12 of the electronic device and extends to a lower surface of the shell 12.

Figure 9:
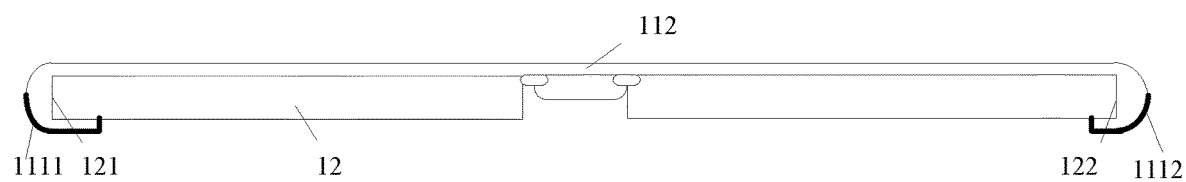
FIG. 9 is a schematic diagram of an electronic device according to some embodiments of the present disclosure.

For example, the antenna region 111 includes a first antenna subregion 1111 and a second antenna subregion 1112, which are located two opposite edge regions of the flexible display, respectively. According to the positional relationship as described in the sixth structure of the flexible display, the display region 112 is disposed at the upper surface of the shell 12 of the electronic device and extends to a first frame 121 and a second frame 122 of the shell 12, the first antenna subregion 1111 is disposed at the first frame 121 of the shell 12 of the electronic device and extends to the lower surface of the shell 12, and the second antenna subregion 1112 is disposed at the second frame 122 of the shell 12 of the electronic device and extends to the lower surface of the shell 12, as illustrated in FIG. 9.

In the case that the flexible display has any structure of the first to fourth structures as described above, in a same cross section of the flexible display, for at least one antenna subregion, a distance between a perpendicular line from a boundary point between the display region 112 and the antenna subregion to the upper surface of the shell 12 and a perpendicular line from any point of the antenna subregion other than the boundary point to the upper surface of the shell 12 is greater than 0. In the field of communication technology, in a same cross section, a region between the perpendicular line from the boundary point between the display region 112 and the antenna subregion to the upper surface of the shell 12 and the perpendicular line from any point of the antenna subregion other than the boundary point to the upper surface of the shell 12 is commonly referred as a clearance region. In a same cross section, when the distance between the perpendicular line from the boundary point between the display region 112 and the antenna subregion to the upper surface of the shell 12 and the perpendicular line from any point of the antenna subregion other than the boundary point to the upper surface of the shell 12 is greater than 0, it indicates that a clearance region is present between the display region 112 and the antenna subregion of the electronic device.

Figure 10:
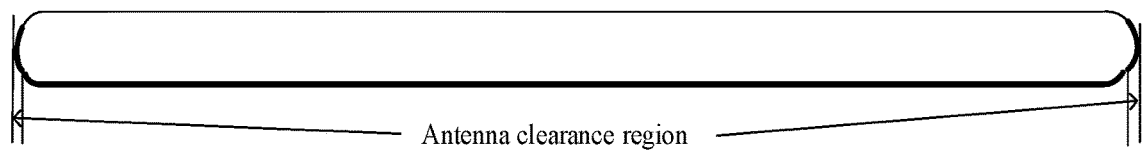
FIG. 10 is a schematic diagram of an electronic device according to some embodiments of the present disclosure.

For example, as illustrated in FIG. 10, a clearance region is present between a perpendicular line from a boundary point between the display region and a left antenna subregion to a vertical direction and a perpendicular line from any point of the left antenna subregion other than the boundary point to the vertical direction, that is, the clearance region is present between the display region and the left antenna subregion of the electronic device. Similarly, a clearance region is present between a perpendicular line from a boundary point between the display region and a right antenna subregion to a vertical direction and a perpendicular line from any point of the right antenna subregion other than the boundary point to the vertical direction, that is, the clearance region is present between the display region and the right antenna subregion of the electronic device.

It should be noted that, in the case that the flexible display has any structure of the first to fourth structures as described above, the flexible display includes at least one subregion which is not disposed at the lower surface of the shell of the electronic device.

In some embodiments of the present disclosure, the antenna of the electronic device is designed not only to be away from metal components, but also to be away from unrelated components such as batteries, oscillators, shields, and cameras, thereby reserving a clearance region for the antenna and ensuring the omnidirectional communication effect of the antenna. Since the electronic device adopting any one of the first to the fourth flexible display structures is capable of reserving a larger clearance region for the antenna, the communication capability of the electronic device is greatly improved.

In the case that the flexible display adopts the fifth structure or the sixth structure as described above, for at least one antenna subregion, a maximum value of perpendicular distances from any point of the antenna subregion to a plane where the upper surface of the shell is located is equal to a thickness of the electronic device.

Herein, it should be noted that, a maximum value of perpendicular distances from any point of an antenna (sub) region to a plane where an upper surface of a shell of an electronic device is located is referred as a height of the antenna (sub)region, and term "a height of an antenna (sub)region" and its equivalents, deformations and variants thereof are interchangeable.

Therefore, for the above-described at least one antenna subregion of the flexible display adopting the fifth structure or the sixth structure, though there is no clearance region present between the antenna subregion and the display region, the antenna subregion has a maximized antenna height. In the field of communication technology, by maximizing the height of the antenna, a distance between the antenna and components such as a main board and a battery of the electronic device may be increased so as to reduce interferences of these components on the antenna, thereby greatly improving the communication capability of the electronic device.

Figure 11:
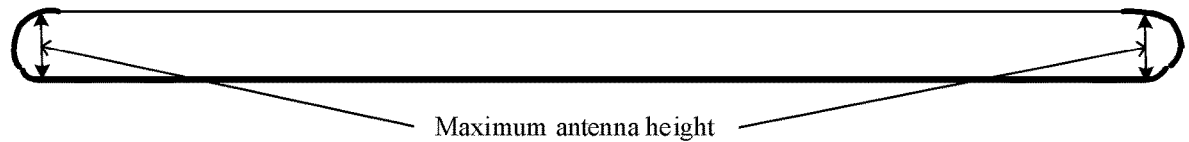
FIG. 11 is a schematic diagram of an electronic device according to some embodiments of the present disclosure.

For example, as illustrated in FIG. 11, a maximum value of perpendicular distances from any point of a left antenna subregion to a plane where the upper surface of the shell is located is equal to the thickness of the electronic device; and a maximum value of perpendicular distances from any point of a right antenna subregion to the plane where the upper surface of the shell is located is also equal to the thickness of the electronic device. In such a case, the height of the antenna is maximized, thereby reducing the interferences of other components on the antenna.

It should be noted that, in the case that the flexible display adopts the fifth structure or the sixth structure as described above, the flexible display includes at least one antenna subregion which needs to be disposed at the lower surface of the shell of the electronic device.

In addition, it will be appreciated to those skilled in the art that the first to sixth structures as described above are merely illustrative for certain subregion(s), and can be used in any combination thereof in any manner in a flexible display. Therefore, in some embodiments, the flexible display can include both an antenna subregion between which and the display region a clearance region is present and an antenna subregion which is capable of maximizing the antenna height, that is, the flexible display can increase both the clearance region and the antenna height.

The flexible display according to embodiments of the present disclosure effectively increases the clearance region and/or the height of the antenna, and avoids the interferences of other components on the antenna to the most degree. The electronic device adopting the flexible display according to embodiments of the present disclosure has a greatly improved communication capability. Especially, for an electronic device applying the flexible display according to embodiments of the present disclosure, the interference to the antenna generated when the electronic device is folded inwards (i.e., the flexible display is folded and the folded parts of the flexible display are attached) is minimized, and thus the communication capability of the electronic device is still stronger.

Figure 12:
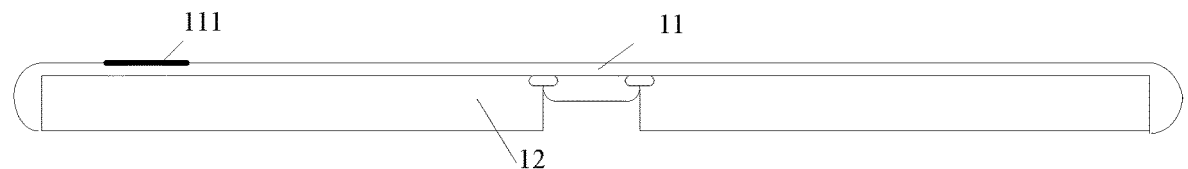
FIG. 12 is a schematic diagram of an electronic device according to some embodiments of the present disclosure.
Figure 13:
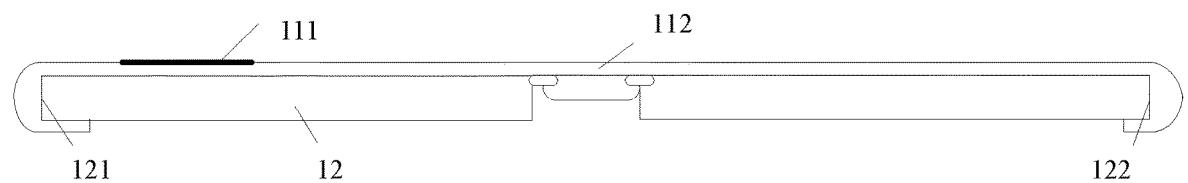
FIG. 13 is a schematic diagram of an electronic device according to some embodiments of the present disclosure.
Figure 14:
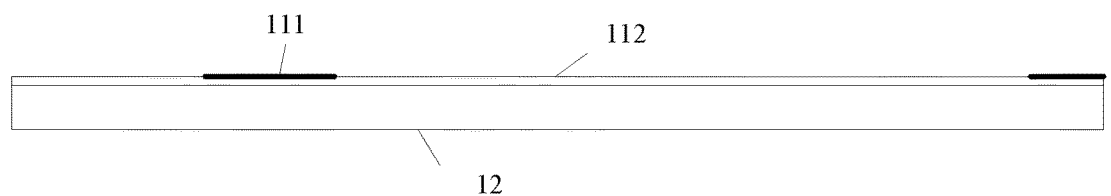
FIG. 14 is a schematic diagram of an electronic device according to some embodiments of the present disclosure.

In some embodiments of the present disclosure, as illustrated in any one of FIG. 12 to FIG. 14, the antenna region 111 is located at a partial or whole region of the flexible display disposed at the upper surface of the shell of the electronic device. This antenna region 111 can include at least one antenna subregion, which is located at the partial or whole region of the flexible display disposed at the upper surface of the shell of the electronic device. With this design manner, the antenna region can be selected based on wiring requirements and communication requirements, thereby not only solving the problem of insufficient antenna coverage, but also making the layout of the antenna more flexible. Especially, for an electronic device applying the flexible display according to embodiments of the present disclosure, the interference to the antenna generated when the electronic device is folded outwards (i.e., folded parts of the shell are attached to each other) is minimized, and thus the communication capability of the electronic device is still stronger.

In some embodiments of the present disclosure, depending on a preparation process, the flexible display 11 includes, in sequence from bottom to top, a flexible substrate 21, a thin film transistor (TFT) circuit layer 22, a luminescent layer 23, a flexible encapsulation layer 24, a polarizing layer 25, an optically clear adhesive (OCA) layer 26 and a cover glass/polyimide (CG/PI) layer 27. For technical considerations, the metal trace in the antenna region can be disposed on one or more of the polarizing layer, the OCA layer and the CG/PI layer. In an example, the metal trace in the antenna region is disposed on the polarizing layer. In another example, the metal trace in the antenna region is disposed on the OCA layer. In yet another example, the metal trace in the antenna region is disposed on the CG/PI layer. In some examples, the metal trace in the antenna region can be disposed on two or three layers of the polarizing layer, the OCA layer and the CG/PI layer, and specific combinations thereof will be understood by those skilled in the art based on the disclosure herein, and thus will not be elaborated.

With the flexible display according to embodiments of the present disclosure, by providing the metal trace on one or more layers of an existing flexible display, the function of the antenna is achieved without additionally reserving antenna region, thereby meeting the development demands of the display.

In some embodiments of the present disclosure, besides the flexible substrate 21, the TFT circuit layer 22, the luminescent layer 23, the flexible encapsulation layer 24, the polarizing layer 25, the OCA layer 26 and the CG/PI layer 27, the flexible display further includes an antenna layer 28. The antenna layer 28 is disposed between the OCA layer 26 and the CG/PI layer 27 or between the polarizing layer 25 and the OCA layer 26. In a preparation process of the flexible display, the metal trace 1113 in the antenna region 111 can be disposed on the antenna layer 28.

With the flexible display according to embodiments of the present disclosure, by adding a new layer and providing the metal trace on the added layer, the function of the antenna is achieved without additionally reserving antenna region, thereby meeting the development demands of the display.

It should be noted that, the antenna region 111 described above can be obtained by only extending any one or more layers provided with the metal trace 1113. For example, in the embodiment where the metal trace 1113 is disposed on the polarizing layer 25, the antenna region 111 can be obtained by only extending the polarizing layer 25. In the embodiment where the metal trace 1113 is disposed on the OCA layer 26, the antenna region 111 can be obtained by only extending the OCA layer 26. In the embodiment where the metal trace 1113 is disposed on the CG/PI layer 27, the antenna region 111 can be obtained by only extending the CG/PI layer 27. Also, the antenna region 111 can be obtained by extending all the layers included in the flexible display, and the present disclosure is not limited thereto.

In a second aspect of embodiments of the present disclosure, there is provided an electronic device. The electronic device includes a flexible display 11 and a shell 12, and the flexible display 11 is disposed on the shell 12. Depending on the structures of the flexible display, the electronic device can have a structure as illustrated in any one of FIG. 4A to FIG. 9 and FIG. 12 to FIG. 14.

In a third aspect of embodiments of the present disclosure, there is provided a method for preparing a flexible display. In some embodiments, the method includes the following operations as illustrated at blocks of FIG. 15.

At block 1501, a TFT circuit layer, a luminescent layer and a flexible encapsulation layer are provided on a flexible substrate in sequence.

The flexible substrate can have a thickness ranging from 0 to 19 µm. The TFT circuit layer can have a thickness ranging from 0 to 7 µm. The luminescent layer can have a thickness ranging from 0 to 0.5 µm. The flexible encapsulation layer can have a thickness ranging from 0 to 15 µm.

At block 1502, a polarizing layer, an OCA layer and a CG/PI layer are provided on the flexible encapsulation layer in sequence, and a metal trace is provided on a specified region of one or more of the polarizing layer, the OCA layer and the CG/PI layer.

The polarizing layer is configured to change a propagation direction of incident lights, and can be a half-wave plate or a quarter-wave plate, etc. The OCA layer is configured to bond the polarizing layer with the CG/PI layer.

The specified region is configured as an antenna region, and the metal trace is configured as an antenna of an electronic device.

In some embodiments, the metal trace includes any one or more selected from copper, iron, aluminum, argentum, tin, gold, nickel, chromium, indium, zinc and alloys or oxides thereof, and fiberglass.

In some embodiments, the metal trace can be provided on the specified region of the polarizing layer to be used as the antenna of the electronic device. In some embodiments, the metal trace can be provided on the specified region of the OCA layer to be used as the antenna of the electronic device. In some embodiments, the metal trace can be provided on the specified region of the CG/PI layer to be used as the antenna of the electronic device. In some embodiments, the metal trace can be provided on the specified regions of two or three of the polarizing layer, the OCA layer and the CG/PI layer to be used as the antenna of the electronic device, and specific combinations thereof will be understood by those skilled in the art based on the disclosure herein, and thus will not be elaborated.

Figure 15:
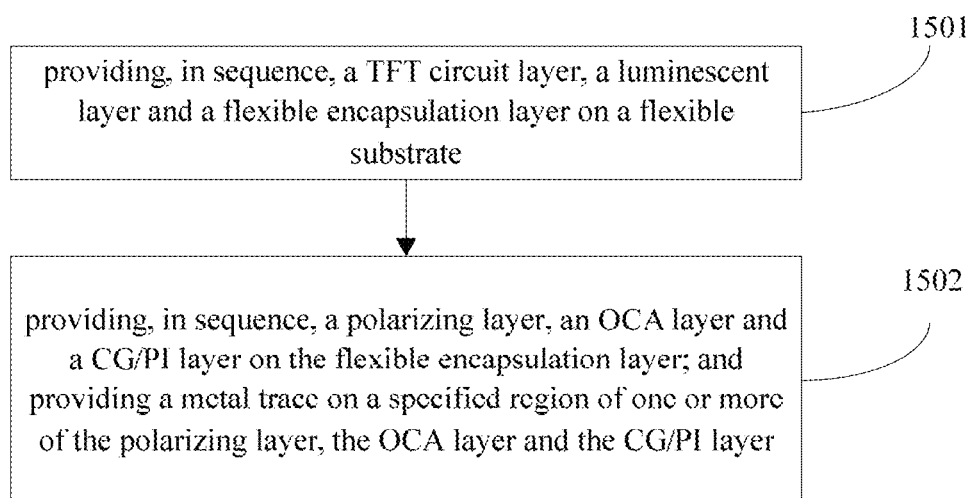
FIG. 15 is a flow chart of a method for preparing a flexible display according to some embodiments of the present disclosure.
Figure 16:
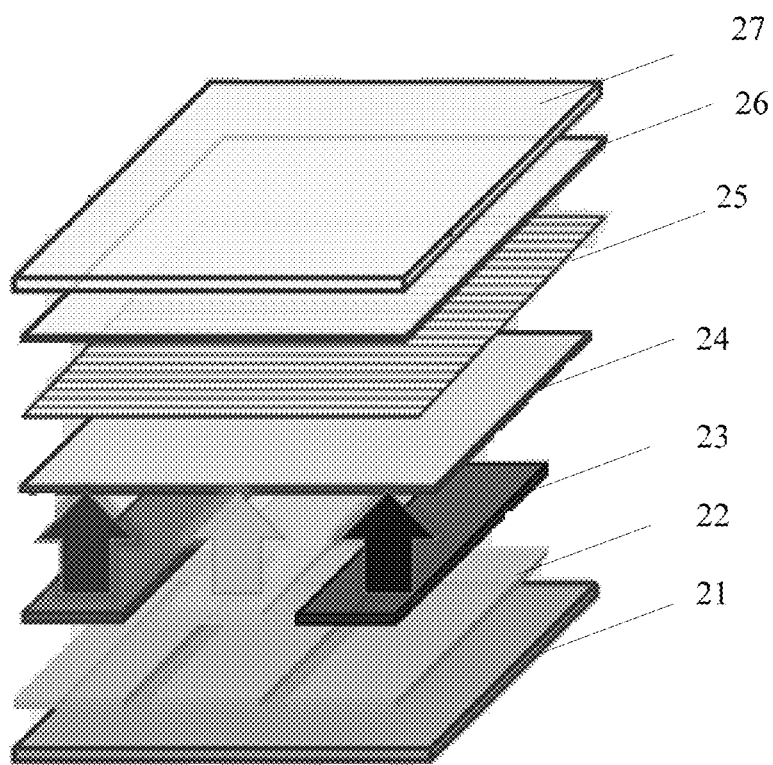
FIG. 16 is a schematic diagram of a flexible display according to some embodiments of the present disclosure.

FIG. 16 shows a structure of the flexible display prepared according to the method as illustrated in FIG. 15. As illustrated in FIG. 16, the TFT circuit layer 22 is disposed on the flexible substrate 21, the luminescent layer 23 is disposed on the TFT circuit layer 22, the flexible encapsulation layer 24 is disposed on the luminescent layer 23, the polarizing layer 25 is disposed on the flexible encapsulation layer 24, the OCA layer 26 is disposed on the polarizing layer 25, the CG/PI layer 27 is disposed on the OCA layer 26, and the specified region of any one or more of the polarizing layer, the OCA layer and the CG/PI layer is provided with the metal trace (not shown in FIG. 16).

Figure 17:
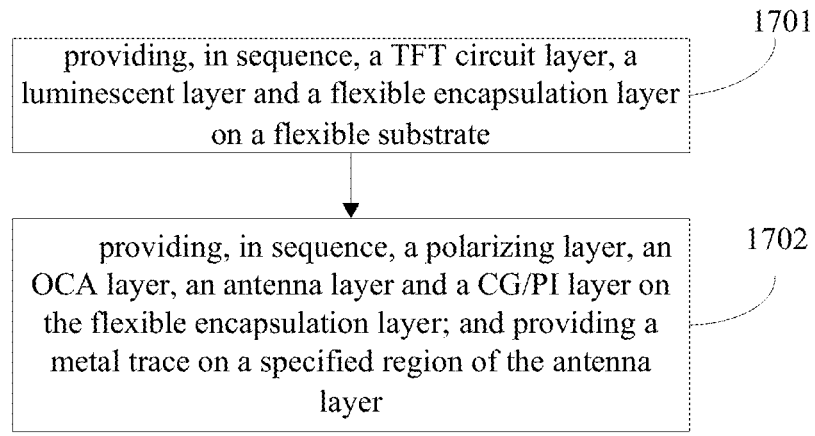
FIG. 17 is a flow chart of a method for preparing a flexible display according to some embodiments of the present disclosure.

With the method according to embodiments of the present disclosure, by providing the metal trace on any one or more of the polarizing layer, the OCA layer and the CG/PI layer to be used as the antenna of the electronic device, there is no need to separately reserve space for the antenna at the electronic device, and thus both the display and communication requirements of the electronic device are satisfied In some embodiments of the present disclosure, there is provided a method for preparing a flexible display, which includes the following operations as illustrated at blocks of FIG. 17.

At block 1701, a TFT circuit layer, a luminescent layer and a flexible encapsulation layer are provided on a flexible substrate in sequence.

The flexible substrate can have a thickness ranging from 0 to 19 µm. The TFT circuit layer can have a thickness ranging from 0 to 7 µm. The luminescent layer can have a thickness ranging from 0 to 0.5 µm. The flexible encapsulation layer can have a thickness ranging from 0 to 15 µm.

At block 1702, a polarizing layer, an OCA layer, an antenna layer and a CG/PI layer are provided on the flexible encapsulation layer in sequence, and a metal trace is provided on a specified region of the antenna layer.

The polarizing layer is configured to change a propagation direction of incident lights, and can be a half-wave plate or a quarter-wave plate, etc. The OCA layer is configured to bond the polarizing layer with the CG/PI layer.

The specified region is configured as an antenna region, and the metal trace is configured as an antenna of an electronic device.

In some embodiments, the metal trace includes any one or more selected from copper, iron, aluminum, argentum, tin, gold, nickel, chromium, indium, zinc and alloys or oxides thereof, and fiberglass.

With the method according to embodiments of the present disclosure, by providing the antenna layer between the OCA layer and the CG/PI layer, and providing the metal trace on the antenna layer to be used as the antenna of the electronic device, there is no need to separately reserve space for the antenna at the electronic device, and thus both the display and communication requirements of the electronic device are satisfied.

Figure 18:
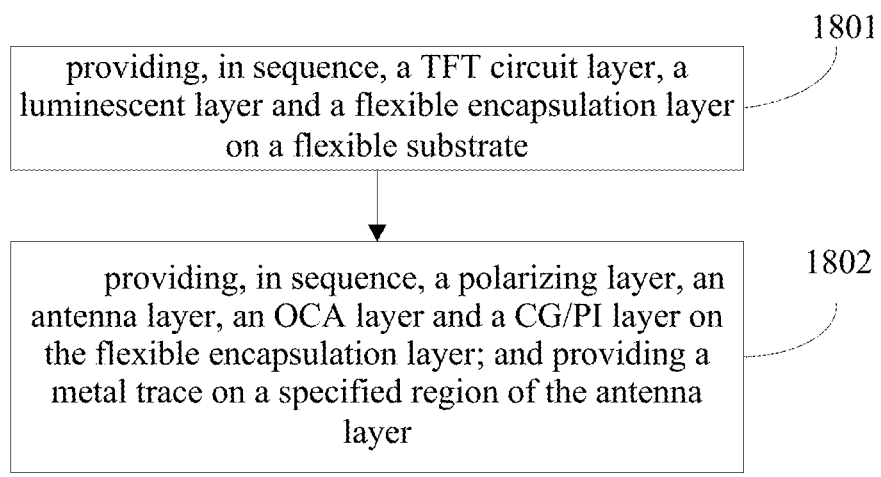
FIG. 18 is a flow chart of a method for preparing a flexible display according to some embodiments of the present disclosure.

In some embodiments of the present disclosure, there is provided a method for preparing a flexible display, which includes the following operations as illustrated at blocks of FIG. 18.

At block 1801, a TFT circuit layer, a luminescent layer and a flexible encapsulation layer are provided on a flexible substrate in sequence.

The flexible substrate can have a thickness ranging from 0 to 19 µm. The TFT circuit layer can have a thickness ranging from 0 to 7 µm. The luminescent layer can have a thickness ranging from 0 to 0.5 µm. The flexible encapsulation layer can have a thickness ranging from 0 to 15 µm.

At block 1802, a polarizing layer, an antenna layer, an OCA layer and a CG/PI layer are provided on the flexible encapsulation layer in sequence, and a metal trace is provided on a specified region of the antenna layer.

The polarizing layer is configured to change a propagation direction of incident lights, and can be a half-wave plate or a quarter-wave plate, etc. The OCA layer is configured to bond the polarizing layer with the CG/PI layer.

The specified region is configured as an antenna region, and the metal trace is configured as an antenna of an electronic device.

In some embodiments, the metal trace includes any one or more selected from copper, iron, aluminum, argentum, tin, gold, nickel, chromium, indium, zinc and alloys or oxides thereof, and fiberglass.

With the method according to embodiments of the present disclosure, by providing the antenna layer between the polarizing layer and the OCA layer, and providing the metal trace on the antenna layer to be used as the antenna of the electronic device, there is no need to separately reserve space for the antenna at the electronic device, and thus both the display and communication requirements of the electronic device are satisfied.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present disclosure be constructed or operated in a particular orientation.

In addition, terms such as "first," "second," . . . , "sixth" are used herein for purposes of description and are not intended to indicate or imply relative importance or significance or to imply the number of indicated technical features. Thus, the feature defined with these terms may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment," "in an embodiment," "in some implementations," "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "some embodiments," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A flexible display, comprising:
   an antenna region, provided thereon with a metal trace which is configured as an antenna of an electronic device to receive or transmit a signal;
   a display region, configured to display screen content of the electronic device;
   a flexible substrate, a thin film transistor (TFT) circuit layer, a luminescent layer, a flexible encapsulation layer, a polarizing layer, an optically clear adhesive (OCA) layer and a cover glass/polyimide (CG/PI) layer.

2. The flexible display according to claim 1, wherein the antenna region comprises an antenna subregion located at any edge region of the flexible display; or
   the antenna region comprises two antenna subregions located at two adjacent or opposite edge regions of the flexible display, respectively; or
   the antenna region comprises three antenna subregions located at any three edge regions of the flexible display, respectively; or
   the antenna region comprises four antenna subregions located at four edge regions of the flexible display, respectively.

3. The flexible display according to claim 1, wherein the flexible display has a rectangular cross section, and at least one antenna subregion of the antenna region is located at one or more edge regions of the rectangular cross section; or
   the flexible display has a U-shaped cross section, and at least one antenna subregion of the antenna region is located at one or two side regions of the U-shaped cross section.

4. The flexible display according to claim 1, wherein the display region is disposed at an upper surface of a shell of the electronic device;
   at least one antenna subregion of the antenna region is disposed at the upper surface of the shell of the electronic device; or
   at least one antenna subregion of the antenna region is disposed at the upper surface of the shell of the electronic device and extends to a frame of the shell; or
   at least one antenna subregion of the antenna region is disposed at a frame of the shell.

5. The flexible display according to claim 1, wherein the display region is disposed at an upper surface of a shell of the electronic device and extends to a frame of the shell; and
   at least one antenna subregion of the antenna region is disposed at the frame of the shell of the electronic device.

6. The flexible display according to claim 4, wherein an antenna clearance region for at least one antenna subregion has a width greater than 0 in a cross section of the flexible display.

7. The flexible display according to claim 6, wherein the width of the antenna clearance region is measured between a first perpendicular line from a boundary point between the display region and the antenna subregion to the upper surface of the shell, and a second perpendicular line from any point of the antenna subregion other than the boundary point to the upper surface of the shell.

8. The flexible display according to claim 1, wherein the display region is disposed at an upper surface of a shell of the electronic device; and
   at least one antenna subregion of the antenna region is disposed at a frame of the shell of the electronic device and extends to a lower surface of the shell.

9. The flexible display according to claim 1, wherein the display region is disposed at an upper surface of a shell of the electronic device and extends to a frame of the shell; and
   at least one antenna subregion of the antenna region is disposed at the frame of the shell of the electronic device and extends to a lower surface of the shell.

10. The flexible display according to claim 8, wherein for at least one antenna subregion, a maximum value of perpendicular distances from any point of the antenna subregion to a plane where the upper surface of the shell is located is equal to a thickness of the electronic device.

11. The flexible display according to claim 9, wherein for at least one antenna subregion, a maximum value of perpendicular distances from any point of the antenna subregion to a plane where the upper surface of the shell is located is equal to a thickness of the electronic device.

12. The flexible display according to claim 1, wherein the antenna region is located at a partial or whole region of the flexible display disposed at an upper surface of a shell of the electronic device.

13. The flexible display according to claim 1, wherein the metal trace in the antenna region is disposed on one or more of the polarizing layer, the OCA layer and the CG/PI layer.

14. The flexible display according to claim 1, further comprising an antenna layer disposed between the OCA layer and the CG/PI layer or between the polarizing layer and the OCA layer,
   wherein the metal trace in the antenna region is disposed on the antenna layer.

15. The flexible display according to claim 1, wherein the metal trace comprises any one or more selected from copper, iron, aluminum, argentum, tin, gold, nickel, chromium, indium, zinc and alloys or oxides thereof, and fiberglass.

16. An electronic device, comprising:
   a flexible display, comprising:
      an antenna region, provided thereon with a metal trace which is configured as an antenna of an electronic device to receive or transmit a signal;
      a display region, configured to display screen content of the electronic device;
      a flexible substrate, a thin film transistor (TFT) circuit layer, a luminescent layer, a flexible encapsulation layer, a polarizing layer, an optically clear adhesive (OCA) layer and a cover glass/polyimide (CG/PI) layer; and
   a shell.

17. A method for preparing a flexible display, comprising:
   providing, in sequence, a thin film transistor (TFT) circuit layer, a luminescent layer and a flexible encapsulation layer on a flexible substrate;
   providing, in sequence, a polarizing layer, an optically clear adhesive (OCA) layer and a cover glass/polyimide (CG/PI) layer on the flexible encapsulation layer; and
   providing a metal trace on a specified region,
   wherein the specified region is configured as an antenna region, and the metal trace is configured as an antenna of an electronic device.

18. The method according to claim 17, wherein providing a metal trace on a specified region comprises providing a metal trace on a specified region of one or more of the polarizing layer, the OCA layer and the CG/PI layer.

19. The method according to claim 17, further comprising providing an antenna layer between the optically clear adhesive (OCA) layer and the cover glass/polyimide (CG/PI) layer or between the polarizing layer and the OCA layer, wherein providing a metal trace on a specified region comprises providing the metal trace on a specified region of the antenna layer.

* * * * *